Feb. 28, 1928.
C. BROWN
1,660,323
GLASS SNAPPING MACHINE
Filed Jan. 2, 1925
3 Sheets-Sheet 1
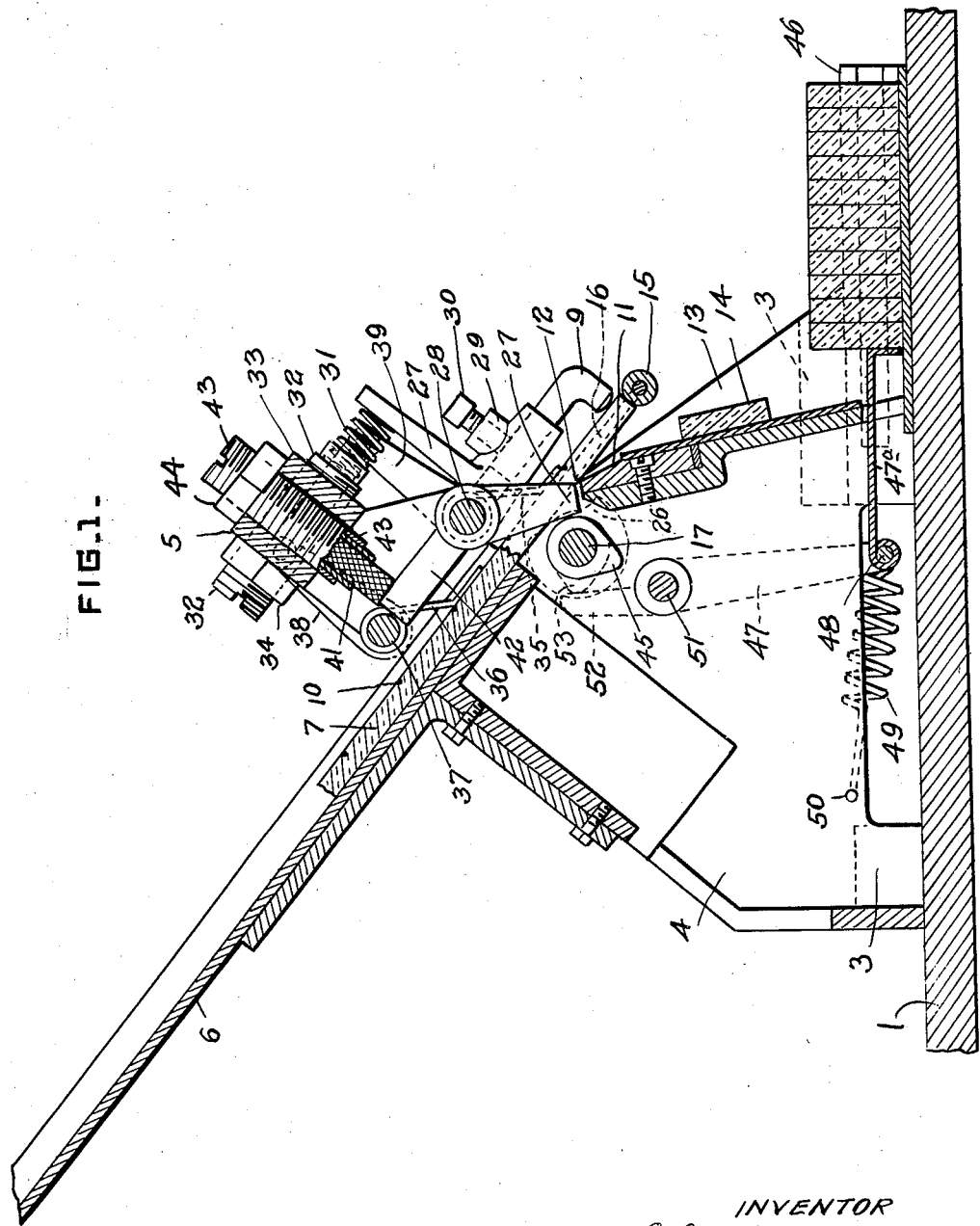
INVENTOR
Christopher Brown
by
James C. Bradley
atty

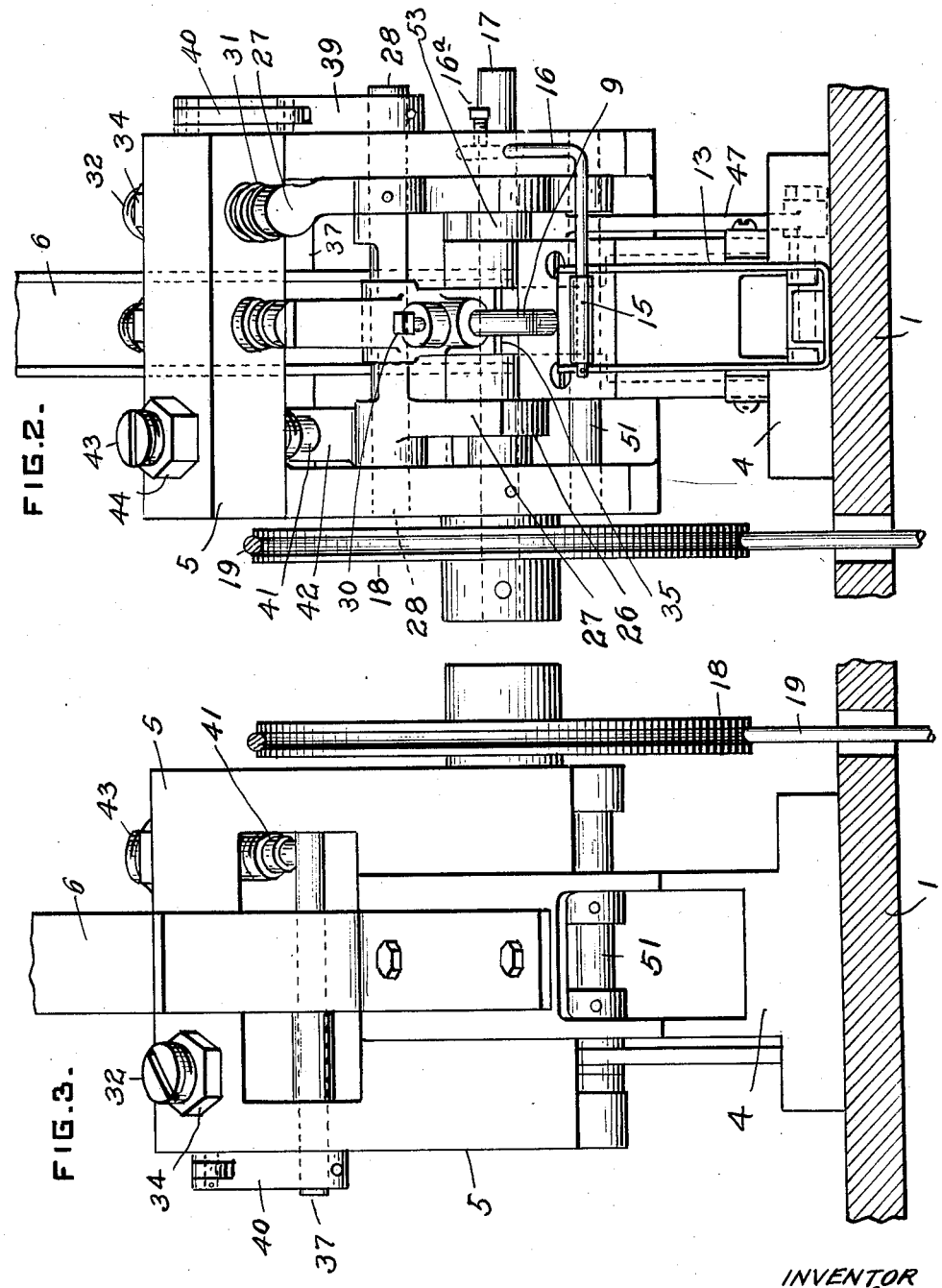

Feb. 28, 1928.
C. BROWN
GLASS SNAPPING MACHINE
Filed Jan. 2, 1925
1,660,323
3 Sheets-Sheet 3
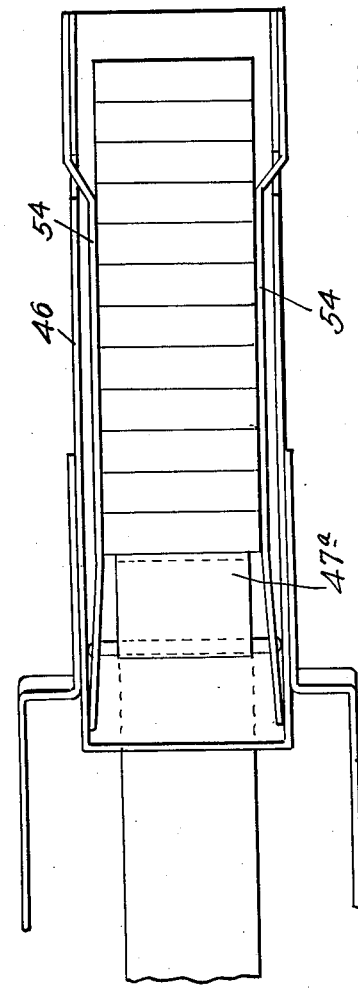
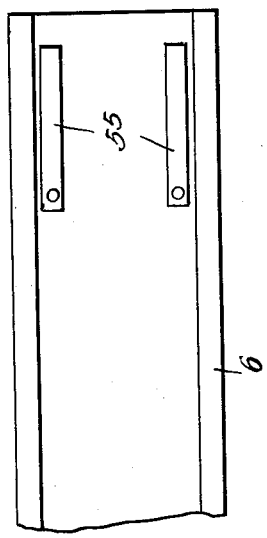
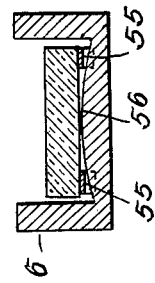
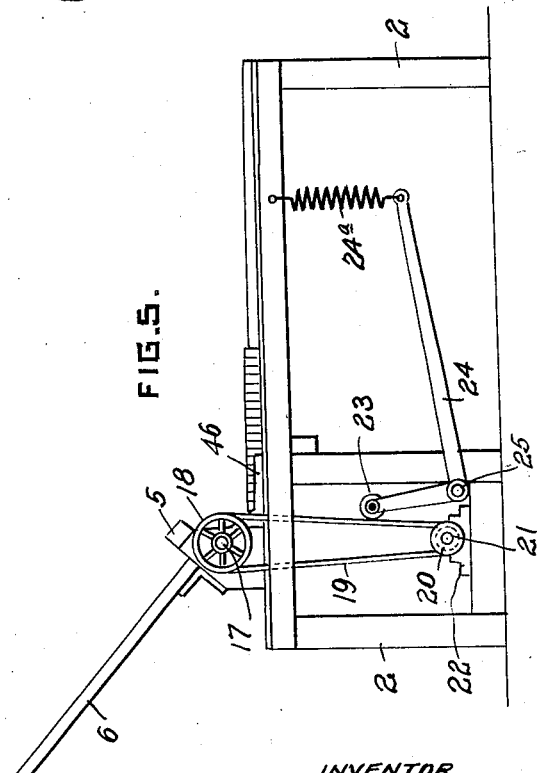
INVENTOR
Christopher Brown
by
James C. Bradley
Atty.

Patented Feb. 28, 1928.

1,660,323

UNITED STATES PATENT OFFICE.

CHRISTOPHER BROWN, OF CHARLEROI, PENNSYLVANIA, ASSIGNOR TO PITTSBURGH PLATE GLASS COMPANY, A CORPORATION OF PENNSYLVANIA.

GLASS-SNAPPING MACHINE.

Application filed January 2, 1925. Serial No. 140.

The invention relates to a machine for snapping glass strips into the sections which constitute the rough blanks for use in the manufacture of spectacle and other lenses. These strips are cut from sheets of plate glass and scored transversely in order to facilitate the breaking of the strips into the required small square sections. This latter operation has heretofore been performed by hand by the use of a small hammer with which the glass strip is tapped by the operator at the lines of scoring. The machine constituting the subject matter of the present invention is designed to accomplish the snapping operation automatically after the scored strips are inserted therein and to stack or assemble the blanks in convenient form for handling and for inspection. One embodiment of the invention is illustrated in the accompanying drawings wherein:

Figure 1 is a side elevation, partially in section, of the machine. Fig. 2 is a front elevation. Fig. 3 is a rear elevation. Fig. 4 is a plan view of the stacking device. Fig. 5 is a side elevation showing the assembled machine on a reduced scale, and Figs. 6 and 7 are enlarged detail views.

Referring to the drawings, 1 is the base plate of the machine which is carried upon the legs 2 (Fig. 5) with the snapping mechanism adjacent the left hand end of the table which is thus provided. Bolted to the top of the table at the lugs 3 (Fig. 1) is the frame casting 4 to which is secured a second casting 5 of U shape, as indicated in Fig. 2, and chute 6 also U shape in cross section for carrying the blanks 7 to be snapped into sections by the hammer 9 at the lower end of the strip, which is designed to successively break off the sections at the lines of scoring. These lines of scoring are indicated by the marks 10 spaced uniformly along the strip, so that the sections of glass which are broken off are of the same length as the width of the strip of glass.

Located adjacent the lower end of the chute 6 is an anvil member 11 having a snapping edge 12 projecting about one-sixteenth of an inch above the level of the bottom of the chute. The lower surface of the strip of glass rests against this edge as indicated in Fig 1 with the scored line 10 opposed thereto, so that when the hammer 9 is applied to the lower end of the section, the glass is snapped off and drops downward into a second chute 13 as indicated at 14. The glass is positioned for snapping off by means of a transverse bar 15 having a stem 16 (Fig. 2) directed longitudinally of the chute 7 and extending through an opening in the casting 5 where it is held in any desired position by adjustment by means of the set screw 16ª.

Extending transversely of the casting 5 is the shaft 17 which carries at its end the grooved pulley 18, and this pulley is driven by means of the belt 19 passing around a drive pulley 20 at the base of the table as indicated in Fig. 5. This latter pulley is carried by a drive shaft 21 driven from a source of power, not shown, being mounted in suitable bearing blocks 22. The belt 19 is loose upon its two pulleys and is tightened to drive the pulley 18 by means of the pulley 23 carried upon the bell crank lever 24 pivoted at 25. The pulley 23 is caused to normally engage the belt to hold it tight by means of the spring 24ª, so that in order to stop the operation of the machine, it is only necessary for the operator to press downward with his foot upon the long arm of the bell crank lever 24. The hammer 9 is actuated from the cam 26 carried by the shaft 17, such cam during its revolution engaging the lower end of the bell crank lever 27 pivoted at 28 upon the casting 5. The hub of this bell crank lever is provided with a lug 29 which receives the end of the hammer 9 and is clamped in adjusted position therein by means of the set screw 30, so that the hammer may be positioned longitudinally depending upon the length of the blank which is to be snapped off and the position of the stop 15. The upper end of the bell crank lever 27 is pressed forward by the spring 31 mounted in the hollow bolt 32. This bolt is screw threaded through the lug 33 forming a part of the casting 5 in order to permit of an adjustment of the tension of the spring and is locked in adjusted position by means of the nut 34. On each revolution of the shaft 17, the cam causes the hammer 9 to be retracted and after such cam moves past the end of the bell crank lever 27, the spring 31 causes the hammer to move forward and strike the blank which is broken off and falls into the chute 13.

In order to hold the glass strip firmly in position during the snapping operation, a pair of leaf springs 35 and 36 are used, the spring 35 being carried by the shaft 28 and the spring 36 by a second shaft 37 extending transversely of the casting 5. The shaft 37 carries at its end a crank arm 38 and this crank arm is operated by a crank arm 39 keyed to the end of the shaft 28, the upper ends of the two crank arms being connected by means of the rod 40. The rotation of the cam 26 and its engagement with the bell crank lever 27 thus causes the two springs 35 and 36 to press down upon the top of the glass at the moment when the hammer 9 strikes the glass to break it off, after which the springs are released during the retraction of the hammer, thus freeing the glass from the springs so that it can move downward by gravity and engage the stop 15 preliminary to another stroke by the hammer.

In order to cushion the blow of the hammer 9, the rubber block 41 is employed, such block being in position to engage the rear end 42 of the member 29 which carries the hammer. This rubber block is carried by the forward end of the hollow bolt 43 extending through the upper portion of the U shaped casting 5, the bolt being threaded through the casting and held in adjusted position by means of the lock nut 44. This adjustable rubber cushion provides a means for regulating the stroke of the hammer so that the force of the blow is of exactly the right degree, being just sufficient to break off the section, but not sufficient to cause a cracking of the glass at any other of the lines of scoring on the strip.

After the lower section of the strip is cracked off by the hammer, the forward end of the strip to the rear of such section catches upon the snapping edge 12, so that in order to secure a forward feed of the strip, it must be lifted slightly from the bottom of the chute. This is accomplished by means of the cam 45 carried by the shaft 17, which cam works through a slot in the bottom of the chute and is so timed that the strip is lifted slightly immediately after a section is cracked off, thus permitting a strip to slide down until its lower end engages the stop 15, as indicated in Fig. 1.

After the blanks are snapped off, they drop down through the chute 13 into the runway 46. Working longitudinally of this runway is a plunger 47ᵃ of sheet metal having its rear end connected to an operating lever 47 by means of the pivot 48. The plunger is normally pulled to the left by means of the spring 49 having its rear end extended laterally as indicated at 50 through an opening in the casting 4, thus anchoring the spring at this point. The lever 47 is pivoted to the casting 4 by means of a transverse shaft 51 and has its upper end 52 in position to be operated by a third cam 53 carried by the shaft 17. This arrangement provides for the timed reciprocation of the plunger 47ᵃ, so that after each blank drops down into the runway 46, it is moved forwardly into contact with the other blanks in the runway, which are thus straightened up into vertical position. Each reciprocation of the plunger also moves the entire stack one step forward. In order to keep the blanks in upright position in the runway, a pair of springs 54—54 (Fig. 4) are provided along the sides of the runway yieldingly engaging the side edges of the blanks. In this manner the blanks are brought into stacked relation and may be readily inspected for defects by the inspector who occupies a position at the side of the table. A number of blanks are lifted by him from the table in stacked relation and inspected in the usual way, the good blanks being placed in one compartment and the defective ones in another compartment.

The operation of the machine will be apparent from the foregoing, but will be briefly restated. The motor drive being started to cause the rotation of the wheel 18 and the shaft 17, a strip of glass scored at the points 10 is placed in the chute 6, so that its lower end engages the stop 15. The rotation of the cam 26 upon the shaft 17 causes the upper end of the bell crank lever 27 to move to the left compressing the spring 31 and moving the end of the hammer 9 back from the glass. As soon as the cam passes the end of the lever 27, the spring 31 causes the hammer to strike its blow against the glass section, thus breaking it off, so that it falls down into the runway 46. At this time the cam 45 comes into play to lift the glass strip so that the lower end is brought above the cracking off edge 12, thus permitting the strip to slide down the chute until its end engages the stop 15, thus preparing it for the next blow. At the moment of impact of the hammer against the glass, the two springs 35 and 36 which are connected to the shafts 28 and 37 are caused to press down upon the strip so as to hold it against vibration at the moment of impact. The withdrawal of the hammer from its striking position by the rotation of the two shafts 28 and 37 in a counterclockwise direction releases the two springs so that the strip is free to move downward when its lower edge is lifted above the snapping off edge 12 as above described. At the moment the glass section is broken off, the stacking plunger 47ᵃ is in its withdrawn position to the left of that shown in Fig. 1, and this plunger is now caused to move forward by the lever 47, whose upper end is moved to the left by the cam 53 upon the shaft 17. This operation is continued until all of the sections of the glass strip are snapped off, the two springs 35 and 36 being of a special service in the latter part of the cracking off operation upon the strip in order to hold such strip after its weight has been diminished to such a point that it would not lie flat in the chute during the cracking off operation without the application of holding means for performing this function.

Figs. 6 and 7 indicate the construction at the lower end of the chute 6 involving a pair of springs 55 which press up against the bottom of the strip of glass. This gives an additional cushioning effect tending to reduce breakage in the portion of the strip lying in the chute above the line of cracking off, particularly in the case of thick strips of glass requiring a relatively heavy blow by the hammer. It has also been found of advantage to crown the bottom of the chute as indicated at 56. This gives a bearing at the center of the glass strip even when the strip is not flat on its lower surface, and with such central bearing, the blanks have been found to crack off straighter than is the case with a flat bottom chute, and here again the advantage is greater with the heavier strips of glass which have a greater tendency to crack at an angle than is the case with the lighter strips.

What I claim is:

1. In combination in a machine for snapping transversely scored glass strips, a guideway for receiving a glass strip to be snapped into sections, a snapping edge adjacent the end of the guideway, a stop for engaging the end of strip positioned in advance of the snapping edge a distance such that one of the transverse score lines on the strip comes over said snapping edge when the strip end engages the stop, a hammer for striking the section of the strip lying in advance of said snapping edge, and automatic means for causing the hammer to strike at timed intervals and for causing a step by step forward feed of the strip.

2. In combination in a machine for snapping transversely scored glass strips, a guideway for receiving a glass strip to be snapped into sections, a snapping edge adjacent the end of the guideway, a stop for engaging the end of strip positioned in advance of the snapping edge a distance such that one of the transverse score lines on the strip comes over said snapping edge when the strip end engages the stop, a hammer for striking the section of the strip lying in advance of said snapping edge, automatic means for causing the hammer to strike at timed intervals, and for causing a step by step forward feed of the strip, a chute arranged to receive the sections of the strip and support them in upright position, and reciprocating means operating in timed relation with the hammer for feeding each section forward in the chute to form a stack and for moving the stack forward step by step.

3. In combination in a machine for snapping transversely scored glass strips, a guideway for receiving a glass strip to be snapped into sections, a snapping edge adjacent the end of the guideway, a stop for engaging the end of strip positioned in advance of the snapping edge a distance such that one of the transverse score lines on the strip comes over said snapping edge when the strip end engages the stop, a hammer for striking the section of the strip lying in advance of said snapping edge, automatic means for causing the hammer to strike at timed intervals, and for causing a step by step forward feed of the strip, a chute arranged to receive the sections of the strip and support them in upright position, reciprocating means operating in timed relation to the hammer for feeding each section forward in the chute to form a stack and for also moving the stack forward step by step, and yielding means for applying resistance opposing the forward movement of the stack and tending to maintain the sections in upright position.

4. In combination in a machine for snapping transversely scored glass strips, a guideway for receiving a glass strip to be snapped into sections, a snapping edge adjacent the end of the guideway, a stop for engaging the end of strip positioned in advance of the snapping edge a distance such that one of the transverse score lines on the strip comes over said snapping edge when the strip end engages the stop, a hammer for striking the section of the strip lying in advance of said snapping edge, automatic means for causing the hammer to strike at timed intervals, and for causing a step by step forward feed of the strip, a chute arranged to receive the sections of the strip and support them in upright position, reciprocating means operating in timed relation to the hammer for feeding each section forward in the chute to form a stack and for also moving the stack forward step by step, and yielding means for applying frictional resistance to the side edges of the sections tending to maintain them in upright position and opposing the forward movement of the stack.

5. In combination in a machine for snapping transversely scored glass strips, a guideway for receiving a glass strip to be snapped into sections, a snapping edge adjacent the end of the guideway, a stop for engaging the end of strip positioned in advance of the snapping edge a distance such that one of the transverse score lines on the strip comes over said snapping edge when the strip end engages the stop, a hammer for striking the section of the strip lying in advance of said snapping edge, automatic means for causing the hammer to strike at timed intervals and for causing a step by step forward feed of the strip, and resilient means for cushioning the impact of the hammer.

6. In combination in a machine for snapping transversely scored glass strips, a guideway for receiving a glass strip to be snapped into sections, a snapping edge adjacent the end of the guideway, a stop for engaging the end of the strip positioned in advance of the snapping edge a distance such that one of the transverse score lines on the strip comes over said snapping edge when the strip end engages the stop, a hammer for striking the section of the strip lying in advance of said snapping edge, automatic means for causing the hammer to strike at timed intervals and for causing a step by step forward feed of the strip, and yielding means arranged to absorb a part of the impact of the hammer as it strikes the glass.

7. In a glass snapping machine, a reciprocating hammer having an unyielding striking end, means for feeding a transversely scored strip of glass beneath the hammer so as to be struck thereby, and resilient means arranged to absorb a portion of the impact of the hammer as it strikes the glass.

8. In combination in a machine for snapping transversely scored glass strips, an inclined guideway for receiving a glass strip to be snapped into sections, a snapping edge adjacent the lower end of the guideway and lying above the level of the bottom of said guideway, a stop for engaging the end of the strip positioned in advance of the snapping edge a distance such that one of the transverse score lines on the strip comes over the snapping edge when the end of the strip engages the stop, a hammer for striking the section of the strip in advance of said snapping edge, automatic means for causing the hammer to strike at timed intervals, and automatic means for lifting the lower end of the strip after each blow of the hammer to bring such edge above the snapping edge and permit it to move downward till it engages said stop.

9. In combination in a machine for snapping transversely scored glass strips, an inclined guideway for receiving a glass strip to be snapped into sections, a snapping edge adjacent the lower end of the guideway and lying above the level of the bottom of such guideway, a stop for engaging the end of the strip positioned in advance of the snapping edge a distance such that one of the transverse score lines on the strip comes over the snapping edge when the end of the strip engages the stop, a hammer for striking the section of the strip in advance of said snapping edge, automatic means for causing the hammer to strike at timed intervals and for causing a step by step forward movement of the strip, and means to the rear of the snapping edge for yieldingly pressing the strip down against such edge.

10. In combination in a machine for snapping transversely scored glass strips, an inclined guideway for receiving a glass strip to be snapped into sections, a snapping edge adjacent the lower end of the guideway and lying above the level of the bottom of such guideway, a stop for engaging the end of the strip positioned in advance of the snapping edge a distance such that one of the transverse score lines on the strip comes over the snapping edge when the end of the strip engages the stop, a hammer for striking the section of the strip in advance of said snapping edge, automatic means for causing the hammer to strike at timed intervals and for causing a step by step forward movement of the strip, and yielding means operating in timed relation with the stroke of the hammer to press down upon the upper surface of the strip as the hammer strikes and to release such pressure on the back stroke of the hammer.

11. In combination in a machine for snapping transversely scored glass strips, a guideway for receiving a glass strip to be snapped into sections, a snapping edge adjacent the end of the guideway, a stop for engaging the end of the strip positioned in advance of the snapping edge a distance such that one of the transverse score lines on the strip comes over said snapping edge when the strip end engages the stop, a hammer for striking the section of the strip lying in advance of said snapping edge, automatic means for causing the hammer to strike at timed intervals and for causing a step by step forward feed of the strip, and yielding means in the guideway to the rear of the snapping edge pressing upward against the bottom of the glass strip.

12. In combination in a machine for snapping transversely scored glass strips, an inclined guideway for receiving the glass strip having its bottom surface convex, a snapping edge adjacent the end of the guideway, a stop for engaging the end of the strip positioned in advance of the snapping edge, a hammer for striking the strip in advance of said snapping edge, and automatic means for causing the hammer to strike at timed intervals.

13. In a glass snapping machine, a reciprocating striking member, means for feeding a transversely scored strip of glass beneath the member so as to be struck thereby, and yielding impact means for engaging the striking member and absorbing a portion of the force of its blow at the moment of its impact with the glass.

In testimony whereof, I have hereunto subscribed my name this 17th day of December, 1924.

CHRISTOPHER BROWN.